United States Patent
Schuhmacher et al.

(10) Patent No.: US 6,656,543 B2
(45) Date of Patent: Dec. 2, 2003

(54) CHOLESTERIC LAYERED MATERIAL, AND THE PRODUCTION THEREOF

(75) Inventors: Peter Schuhmacher, Mannheim (DE); Norbert Schneider, Altrip (DE); Volker Richter, Heidelberg (DE); Wolfgang Best, Freinsheim (DE); Albert Kohl, Laumersheim (DE); Peter Blaschka, Ludwigshafen (DE); Claudia Sierakowski, Griesheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/285,078

(22) Filed: Nov. 1, 2002

(65) Prior Publication Data

US 2003/0085380 A1 May 8, 2003

Related U.S. Application Data

(63) Continuation of application No. 09/926,026, filed as application No. PCT/EP00/01303 on Feb. 17, 2000, now abandoned.

(30) Foreign Application Priority Data

Feb. 17, 1999 (DE) .......................... 199 06 589

(51) Int. Cl.$^7$ ............................................... C09K 19/00
(52) U.S. Cl. ................... 428/1.2; 428/1.1; 252/299.01
(58) Field of Search ................... 428/1.1, 1.2, 1.5, 428/1.51, 1.52, 1.53, 1.61; 252/299.01, 299.7

(56) References Cited

U.S. PATENT DOCUMENTS

| 5,798,147 A | * | 8/1998 | Beck et al. ............... 252/299.5 |
| 6,103,323 A | * | 8/2000 | Motomura et al. ......... 428/1.3 |
| 6,143,379 A | * | 11/2000 | Schoenfeld et al. ........ 428/1.1 |

FOREIGN PATENT DOCUMENTS

| DE | 197 15 993 | * 10/1998 | ........... C09K/19/38 |
| DE | 197 38 368 | 3/1999 | |
| DE | 197 38 369 | 3/1999 | |
| DE | 197 57 699 | 6/1999 | |
| EP | 0 872 336 | 10/1998 | |
| JP | 9-133810 | * 5/1997 | ........... G02B/5/30 |
| WO | WO 99/11719 | 3/1999 | |
| WO | WO 99/11733 | 3/1999 | |

OTHER PUBLICATIONS

Translation of Japanese reference "Motomura".*

* cited by examiner

Primary Examiner—Mark F. Huff
Assistant Examiner—Jennifer R. Sadula
(74) Attorney, Agent, or Firm—Oblon, Spivak, McClelland, Maier & Neustadt, P.C.

(57) ABSTRACT

The present invention relates to novel cholesteric layered materials having the layer sequence $A^1/B/A^2$, where $A^1$ and $A^2$ are identical or different and each comprise at least one cholesteric layer, and B is at least one interlayer separating the layers $A^1$ and $A^2$ from one another, wherein layer B is an adhesive layer; cholesteric multilayered pigments which can be produced therefrom; a process for their production, and their use.

34 Claims, 3 Drawing Sheets

Kraft F (cN)

Fig. 5

CHOLESTERIC LAYERED MATERIAL, AND THE PRODUCTION THEREOF

This application is a Continuation application of U.S. application Ser. No. 09/926,026, filed on Aug. 16, 2001, abandoned, which is a 371 of international application PCT/EP00/01303 filed on Feb. 17, 2000.

The present invention relates to cholesteric layered material, to multilayered cholesteric effect pigments, to a process for the production thereof, and to the use thereof.

Cholesteric layered material having the layer sequence $A^1/B/A^2$, where $A^1$ and $A^2$ are identical or different and each include at least one cholesteric layer, and B is at least one interlayer separating the layers $A^1$ and $A^2$ from one another, and cholesteric multilayered pigments having a corresponding structure are disclosed in DE-A-197 38 368.8, DE-A-197 38 369.6, DE-A-197 57 699.0 and PCT/EP98/05544 and PCT/EP98/05545. The disclosure content of these applications is expressly incorporated herein by way of reference.

It is an object of the present invention to provide cholesteric layered structures having a similar structure which can be produced by lamination.

We have found that this object is achieved by the provision of cholesteric layered material of the type described at the outset, having the layer sequence $A^1/B/A^2$, where $A^1$ and $A^2$ are identical or different and each include at least one cholesteric layer, and B is at least one interlayer separating the layers $A^1$ and $A^2$ from one another, where B preferably absorbs all or some of the light transmitted by the layers $A^1$ and $A^2$, and the layer B is an adhesive layer.

In particular, the present invention provides a cholesteric layered material whose adhesive layer B has been produced from a composition including at least one heat- and/or pressure-activatable adhesive.

Examples of suitable adhesive additives are selected from solvent-containing polyurethane, in particular hydroxypolyester-polyurethane, solvent-containing adhesives based on ethylene-vinyl acetate copolymers, polyacrylates, polymethacrylates, polyisobutenes, solvent-containing adhesive dispersions, such as natural rubber, synthetic rubber based on polyvinyl acetate or polyurethane, polyvinyl alcohol, modified cellulose and mixtures thereof. Suitable adhesives are described, for example, in Dauerhaft Kleben [Permanent Bonding], Vincentz-Verlag, Hanover, Dr. H. F. Huber. Suitable adhesives are available, for example, under the tradenames Desmocoll 540 and 400.

Particularly suitable adhesives are those which can be activated at a line pressure in the range from 1 to 30 kg/cm, preferably from 2 to 10 kg/cm, of casting width and/or at a temperature in the range from 20 to 120° C., preferably from 40 to 80° C.

According to a preferred embodiment, cholesteric layered material is provided in which the layer thicknesses of $A^1$ and/or $A^2$ are from about 0.5 to 20 μm, preferably from 1 to 4 μm; and cholesteric layered material whose layer thickness of B is from about 0.3 to 3 μm, preferably from 0.5 to 1.5 μm.

Preference is also given to cholesteric layered material in which the adhesive strength between the adhesive layer B and the layers $A^1$ and $A^2$ are, independently of one another, greater by at least the factor 2, preferably at least the factor 3, for example by the factor 5, than the adhesive strength of the respective layer $A^1$ or $A^2$ to the layer support assigned in each case.

The present invention furthermore relates to a process for the production of the cholesteric layered material described above having the layer sequence $A^1/B/A^2$, where the process has the following steps:

a) application of a first coating composition forming the layer $A^1$ to a first layer support with subsequent curing of the layer $A^1$;

b) application of a second coating composition which forms the adhesive layer B and comprises at least one heat- and/or pressure-activatable adhesive to the supported layer $A^1$ with formation of the laminate $A^1/B$;

c) application of a third coating composition which forms the layer $A^2$ to a second layer support with subsequent curing of the layer $A^2$;

d) lamination of $A^2$ onto the laminate $A^1/B$ by bringing the free sides of the layers $A^2$ and B into contact under the action of pressure and/or temperature with formation of the laminate $A^1/B/A^2$;

e) detachment of the second layer support from the laminate $A^1/B/A^2$; and f) if desired, detachment of the first layer support from the laminate $A^1/B/A^2$.

For example, steps a) and b) here can be carried out in a single operation by simultaneous or sequential application of $A^1$ and B to the first layer support.

In particular, the process is carried out by passing the supported laminate $A^1/B$ with its layer-support side over a first, optionally heatable roll, which is arranged opposite a second, optionally heatable roll, over which the supported layer $A^2$ is passed, likewise with its layer-support side, the gap between the first and second rolls being adjustable by radial movement of the two rolls relative to one another in such a way that the contact pressure between the supported laminate $A^1/B$ and the supported layer $A^2$ is in the range from 1 to 10 kg/cm of coating width.

The supported laminate $A^1/B$ and/or the supported layer $A^2$ is passed over from 1 to 359°, for example from 90 to 180°, of the circumference of the first heatable roll or of the second roll.

In addition, it may be advantageous to heat the supported laminate $A^1/B/A^2$ for at least 1 hour, for example for from 1 to 20 hours, at temperatures of 20° C. or above, for example at from 20 to 60° C., preferably for at least 8 hours at at least 40° C., in order to increase the adhesive strength.

In further modifications, for example, steps d) and e) or steps d), e) and f) or steps a) to f) can be carried out in a single operation.

Process step f) is preferably carried out by blowing the laminate $A^1/B/A^2$ with compressed air, if desired after prior scratching of the surface of the layered structure.

The invention also relates to a process for the preparation of platelet-shaped cholesteric multilayered pigments having the layer sequence $A^1/B/A^2$, which comprises grinding a cholesteric layered material produced in accordance with the invention to a particle size in the range of up to about 200 μm, for example from 10 to 50 μm.

The present invention furthermore relates to platelet-shaped cholesteric multilayered pigments obtainable in this manner which, in particular, have a mean particle size in the range from 3 to 200 μm, for example from 10 to 50 μm, and a thickness of from 2 to 10 μm, for example from 3 to 6 μm.

The invention furthermore relates to compositions, for example coating compositions, comprising at least one cholesteric multilayered pigment according to the invention.

For example, coating compositions of this type are selected from effect paints, inks or films, in particluar from self-covering effect paints, inks or films.

The present invention also relates to the use of the above multilayered pigments and of layered material according to the invention in the vehicle and vehicle accessory sector, in the EDP, leisure, sports and toys sector, as optical components, such as polarizers or filters, in the cosmetics area, in the textiles, leather or jewelry area, in the gift-article area, in writing utensils or on spectacle frames, in the construction sector, in the domestic sector and in print products of all types and for the production of paints and inks or in anticounterfeiting treatment of articles; and to the use of a composition according to the invention for coating utility goods or for painting vehicles.

Depending on the application, the layered material according to the invention can remain on the support film, be detached therefrom or transferred onto a new support. Thus, for example, IR-reflective laminates (having a transparent adhesive layer) can be transferred to glass sheets.

$A^1$ and $A^2$ preferably comprise, independently of one another, cholesteric mixtures selected from a) at least one cholesteric, polymerizable monomer;
b) at least one achiral, nematic, polymerizable monomer and a chiral compound;
c) at least one cholesteric, crosslinkable polymer; or
d) a cholesteric polymer in a polymerizable diluent,
e) at least one cholesteric polymer whose cholesteric phase can be frozen by rapid cooling to below the glass transition temperature, in the cured state.

Curing fixes the uniform alignment of the cholesteric molecules in the cholesteric layer. The upper and lower cholesteric layers $A^1$ and $A^2$ respectively have identical or different optical properties. They can, in particular, reflect light of identical or different wavelength, i.e. they can be of identical or different color. In the latter case, particularly interesting color effects can be achieved. $A^1$ and $A^2$ particularly preferably have opposite directions of optical rotation, so that, for example, $A^1$ reflects light of a certain wavelength in a left-handed circular-polarized manner, whereas $A^2$ reflects light of the same wavelength in a right-handed circular-polarized manner, and the interlayer B is designed to be transparent. For example, a paint comprising pigments according to the invention in this preferred embodiment therefore advantageously appears particularly bright, since $A^1$ and $A^2$ in the paint film are facing the incident light in a random distribution, so that the paint reflects both right- and left-handed circular-polarized light of a certain wavelength, whereas a paint comprising only pigments having only one cholesteric layer or having a plurality of cholesteric layers having the same direction of optical rotation allows either the left- or right-handed circular-polarized light to pass through. The formation of a plurality of cholesteric layers having different reflection wavelengths allows broad-band polarizers to be produced.

$A^1$ and $A^2$ can also have identical or different mechanical properties. For example, they can be of different thickness or brittleness.

The specific design of the adhesive layer B depends on the particular application of the multilayered structure or multilayered pigments. If, for example, high reflection in the visible region is desired, layer B should have high hiding power. If high reflection in the UV or IR region is desired, a highly transparent layer B may be advantageous. It is also particularly advantageous in this case to use layers $A^1$ and $A^2$ having opposite directions of optical rotation. The use of UV absorbers in transparent layers B may likewise be advantageous.

B can, in addition, comprise at least one inorganic or organic absorption pigment, preferably bound in a binder matrix. The absorption pigment can be a white, colored or preferably a black pigment. Suitable inorganic absorption pigments are, for example, titanium dioxide, $Al_2O_3$, barium sulfate, strontium sulfate, zinc oxide, zinc phosphates, black iron oxide, lead chromate, strontium chromate, barium chromate and metallic pigments, such as aluminum or bronze powder.

Suitable organic absorption pigments are, for example, azo pigments, metal complex pigments, such as azo- and azomethine-metal complexes, isoindolinone and isoindoline pigments, phthalocyanine pigments, quinacridone pigments, perinone and perylene pigments, anthraquinone pigments, diketopyrrolopyrrole pigments, thioindigo pigments, dioxazine pigments, triphenylmethane pigments, quinophthalone pigments and fluorescent pigments.

Particularly suitable are finely divided absorption pigments having a mean particle size of from 0.01 to 1 μm, preferably from 0.01 to 0.1 μm.

The cholesteric multilayered material described above and the pigments derived therefrom offer a number of advantages:

a) B can be set to be fully hiding (transmitted light absorbed completely), so that, if the pigmentation level is sufficiently high, the color impression of the layered material or of the pigment is completely independent of the background; there is no need for complex and expensive background treatment matched to transparent interference pigments, as usual hitherto.
b) The color of B can be varied, providing a further control parameter for the color impression of the materials according to the invention.
c) The brightness of the materials according to the invention can additionally be adjusted by variation of the gloss or roughness of B.
d) B can be varied specifically to the application for adjustment of the hardness or flexibility of the material according to the invention.
e) B can be electroconductive and thus provide the material with electroconductivity without the quality of the cholesteric layers being impaired thereby.
f) $A^1$, B and $A^2$ are stacked one on top of the other in uniform thickness and parallel to one another, i.e. form a type of sandwich structure, considerably increasing the brightness of the pigments according to the invention. In addition, this produces an improved color impression compared with pigments coated on all sides, since all the cholesteric molecules in a layer are aligned in the same direction.
g) The color impression is substantially independent of external stimuli, i.e. is stable over a broad temperature and pressure range.

Further advantages are the following:

h) The adhesion of the individual layers of the layer package to one another is considerably improved, and consequently delamination during subsequent grinding to give the multilayered pigment is avoided even further.
i) owing to identical production conditions for $A^1$ and $A^2$, the two cholesteric layers have absolutely identical properties, for example with regard to color impression. The reproducibility of the color formulation is thus considerably simplified.

Suitable compositions of the cholesteric layers $A^1$ and $A^2$ are described in DE-A-197 38 368.8 and 197 38 369.6 from the same applicant. The disclosure content in the application is incorporated herein in its full scope, meaning that the composition of the two cholesteric layers need not be discussed in greater detail at this point. In particular, the latter application states that it is expedient for the production of cholesteric layers to use a cholesteric mixture rendered pourable by dilution. Cholesteric and nematic molecules which can be used for the production of the layers $A^1$ and $A^2$ are described, for example, in DE-A-43 42 280, 196 02 848, 197 136 38, 195 32 408, 197 04 506, 196 31 658, 197 17 371, 195 41 820, 196 19 460, 197 35 829, 197 44 321 and 197 49 123, EP-A-0 358 208, WO 97/00600, 97/49694, 98/03610, 98/04544, 98/14442, 98/23580 and 98/47979, which are expressly incorporated herein by way of reference.

The following compounds of the formulae (A) to (G) may be mentioned as non-limiting examples of suitable cholesteric molecules:

-continued (E)

(F)

(G)

The following compounds of the formulae (H) and (K) may be mentioned as non-limiting examples of suitable nematic compounds:

(H)

(K)

in which $n_1$ and $n_2$, independently of one another, are 4 or 6, where the monomer of the formula (K) is preferably employed as a mixture of compounds in which $n_1/n_2$ is 4/4, 4/6, 6/4 or 6/6. In the compounds of the formulae (H) and (K), the methyl substituent on the central benzene ring may, if desired, also be replaced by a hydrogen atom.

The layers $A^1$ and $A^2$ are produced by applying at least one layer of a reactive, pourable cholesteric mixture, preferably by pouring, onto a support, preferably a mobile support, and forming a solid cholesteric layer. The reactive, pourable cholesteric mixture is preferably applied in the isotropic phase. In a preferred embodiment, the reactive, pourable cholesteric mixture is diluted before pouring and forms the solid cholesteric layer where appropriate with removal of the diluent (during or after). The formation of the solid cholesteric layer can take place by crosslinking, by polymerization or by rapid cooling to below the glass transition temperature (freezing of the cholesteric phase), where the term "crosslinking" is taken to mean the covalent linking of polymeric compounds, and the term "polymerization" is taken to mean the covalent linking of monomeric compounds to form polymers. The term "curing" is taken to mean crosslinking, polymerization or freezing of the cholesteric phase. For the purposes of the present invention, a mixture is referred to as reactive if at least one compound present in the mixture is capable of forming covalent linkages.

The mobile support is preferably strip-shaped and consists, for example, of a web of metal foil, paper or plastic film. The cholesteric mixture is preferably applied with a proportion of diluent of from about 5 to 95% by weight, in particular from about 30 to 80% by weight, in particular from about 40 to 70% by weight, particularly preferably from about 55 to 60% by weight, in each case based on the total weight of the mixture to be applied.

Examples of diluents which can be employed in the process according to the invention are linear or branched esters, especially esters of acetic acid, cyclic ethers and esters, alcohols, lactones, aliphatic and aromatic hydrocarbons, such as toluene, xylene and cyclohexane, and ketones, amides, N-alkylpyrrolidones, especially N-methylpyrrolidone, and in particular tetrahydrofuran (THF), dioxane and methyl ethyl ketone (MEK).

Further examples of suitable diluents are ethers and cyclic ethers, such as tetrahydrofuran or dioxane, chlorinated hydrocarbons, such as dichloromethane, 1,1,2,2-tetrachloroethane, 1-chloronaphthalene, chlorobenzene or 1,2-dichlorobenzene. These diluents are particularly suitable for polyesters and polycarbonates. Suitable diluents for cellulose derivatives are, for example, ethers, such as dioxane, or ketones, such as acetone. If copolyisocyanates are employed as group d) polymers, it is appropriate to use polymerizable diluents, as described in U.S. Pat. No. 08,834,745. Such polymerizable diluents are, for example esters of α,β-unsaturated mono- or dicarboxylic acids, in particular $C_3$–$C_6$-mono- or -dicarboxylic acids, with $C_1$–$C_{12}$-alkanols, $C_2$–$C_{12}$-alkanediols or $C_1$–$C_6$-alkyl ethers and phenyl ethers thereof, for example acrylates and methacrylates, hydroxyethyl or hydroxypropyl acrylate or methacrylate, and 2-ethoxyethyl acrylate or methacrylate;

vinyl $C_1$–$C_{12}$-alkyl ethers, such as vinyl ethyl ether, vinyl hexyl ether or vinyl octyl ether;

vinyl esters of $C_1$–$C_{12}$-carboxylic acids, such as vinyl acetate, vinyl propionate and vinyl laurate;

$C_3$–$C_9$-epoxides, such as 1,2-butylene oxide and styrene oxide;

N-vinylpyrrolidone, N-vinylcaprolactam and N-vinylformamide;

vinylaromatic compounds, such as stryene, α-methylstyrene and chlorostyrene, and compounds containing two or more crosslinkable groups, such as diesters of diols (including polyethylene glycols) with acrylic or methacrylic acid or divinylbenzene.

Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures too can contain small amounts of polymerizable diluents in addition to the inert diluent. Preferred polymerizable solvents which can be added are acrylates, in particular acrylates of higher functionality, such as bis-, tris- or tetraacrylates, particularly preferably high-boiling oligoacrylates. The preferred amount added is about 5% by weight, based on the total weight of the mixture.

If desired, water can also be added to the diluent or even employed as the only diluent.

The crosslinkable or polymerizable mixture can contain commercially available photoinitiators for the photochemical polymerization. These are not necessary for curing by electron beams. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenyl-acetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylamine-benzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

The brightness of the pigment layer can be increased by addition of small amounts of suitable flow-control agents. From about 0.005 to 1% by weight, in particular from 0.01 to 0.5% by weight, based on the amount of cholesteric molecule employed, can be used; suitable flow-control agents are, for example, glycols, silicone oils and in particular acrylate polymers, such as the acrylate copolymers available under the name Byk 361 or Byk 358 from Byk-Chemie, and the modified silicone-free acrylate polymers available under the name Tego flow ZFS 460 from Tego.

If desired, the polymerizable or crosslinkable mixture can also contain stabilizers against UV and weathering effects. Examples of compounds which are suitable for this purpose are derivatives of 2,4-dihydroxybenzophenone, derivatives of 2-cyano-3,3-diphenyl acrylate, derivatives of 2,2',4,4'-tetrahydroxy-benzophenone, derivatives of ortho-hydroxyphenylbenzotriazole, salicylates, ortho-hydroxyphenyl-s-triazines or sterically hindered amines. These substances can be employed alone or preferably in the form of mixtures.

The pourable, reactive cholesteric mixture preferably has a viscosity in the range from about 10 to 500 mPas, in particular from about 2 to 10 mPas, measured at 23° C.

The cholesteric mixture is particularly preferably applied to the support at a rate of from about 1 to 800 m/min, in particular from about 5 to 100 m/min.

In a preferred embodiment of the process, the mixture is applied to the substrate by means of a reverse roll coater, a kiss coater or in particular by means of an extrusion coater, doctor coater or knife coater, very particularly preferably by means of a doctor coater or knife coater.

The mixture is advantageously applied by means of a coating device which subjects the mixture to high shear gradients during application.

Preference is given to a coating device whose coating gap width is in the range from about 2 to 50 μm, in particular from about 4 to 15 μm. It is also advantageous to work at a coater excess pressure of from about 0.01 to 0.7 bar, preferably from 0.05 to 0.3 bar.

Particularly suitable apparatuses for the production of cholesteric layers are coating machines having a knife coater applicator with which a cholesteric mixture can be applied to a support film transported over a roll rotating with high precision. The coating knife is advantageously mounted on a precision sledge, so that a defined gap against the support film can be set precisely.

If desired, the coating machine can be provided with cooling devices, for example with cooling rolls, in order also to make it possible to use heat-sensitive films as substrates.

The cholesteric mixture is preferably applied under increased pressure, in particular at a coater excess pressure in the range from about 0.01 to 0.7 bar, particularly preferably from 0.05 to 0.3 bar.

The applied layer is dried by means of a drying device, for example by means of a circulated-air dryer, and subsequently, or instead of the drying, polymerized or crosslinked thermally, by UV radiation or by electron beams, curing by UV radiation or by electron beams being preferred.

The applied layer is preferably dried to a residual content of volatile diluents of less than 1% by weight, based on the dry weight of the applied layer. The drying is preferably carried out at a temperature in the range from 20 to 100° C. for a period of from about 2 to 60 seconds.

The cured cholesteric layer has preferably a mean dry-layer thickness of from 0.5 to 20 μm, for example from 1 to 10 μm, in particular from 1 to 4.5 μm, particularly preferably from 1 to 3 μm, or from 2 to 4 μM. The cholesteric layers produced in accordance with the invention have preferably a mean layer thickness variation of ±0.2 μm or less, which results in high color constancy of the cholesteric layer. The mean layer thickness variation can be determined in a simple manner, for example microscopically from thin sections. A suitable determination method can be carried out, for example, in accordance with the method described in EP-A-0 566 100.

The cholesteric layers produced in this way can additionally be characterized by at least one of the following parameters:

a) Rz (in accordance with DIN 4768): ≦210 nm, in particular ≦110 nm, for example from about 105 to 40 nm;
b) Ra (in accordance with DIN 4768/1): ≦40 nm, in particular ≦20 nm, preferably ≦16 nm, for example from 15 to 5 nm;
c) gloss (in accordance with DIN 67530) on application of the cholesteric material to a PET film coated black on the back and at a measurement angle of 60°:
  >90, for example from 100 to 190, in particular
  >100, for example from 100 to 130, at a reflection maximum in the blue spectral region; or
  >130, for example from 130 to 160, at a reflection maximum in the green spectral region; or
  >160, for example from 160 to 190, at a reflection maximum in the red spectral region;
d) domain diameter: ≧5 μm, in particular ≧15 μm, preferably ≧20 μm or ≧25 μm with a tendency toward dissolution;
e) depth of the microgrooves delimiting the domains: ≦110 nm, in particular ≦50 nm, preferably ≦15 nm, for example from 10 to 3 nm.

Layer B can, as already mentioned at the outset, comprise at least one inorganic or organic white, colored or black pigment if this layer is to have specific absorption properties.

Preference is given to the use of graphite pigments or various types of carbon black, very particularly preferably readily dispersible color blacks having a specific surface area of 30 to 150 m$^2$/g (BET method) and an absorption capacity of from 50 to 100 ml of dibutyl phthalate/100 g (DBP number).

Particularly preferred absorption pigments are those which give the transmitted-light absorbent layer magnetic properties. Suitable for this purpose are, for example, γ-Fe$_2$O$_3$, Fe$_3$O$_4$, CrO$_2$ and ferromagnetic metal pigments, for example Fe—, Fe—Cu—, and Fe—Ni—Cu alloys. These pigments allow the production of high-gloss, black interlayers.

Pigments whose absorbent layer is magnetic represent a further subject-matter of the present invention. Such pigments can advantageously be aligned as desired by application of a magnetic field. This allows avoidance, for example, of individual pigment platelets projecting from the others, which has the consequence that less light is scattered and the color impression is improved. All platelets can be aligned jointly at a certain angle. It is also possible to generate full-area screens in order to achieve novel color effects or partial screens for optical emphasis of characters or structures. The magnetic, cholesteric pigments according to the invention can also advantageously be employed in a liquid matrix, for example in liquid-crystal displays (LCDs), in which they change their direction and thus their color impression on application of a magnetic field.

The absorption pigments are preferably bound in an organic binder matrix. Binders which can be employed are the systems conventional in paints. Preference is given to radiation-curable systems containing reactive crosslinkable groups, such as acrylic, methacrylic, α-chloroacrylic, vinyl, vinyl ether, epoxide, cyanate, isocyanate or isothiocyanate groups.

Other binders which can be employed are monomeric agents and mixtures thereof with polymeric binders. Suitable monomeric agents are preferably those containing two or more crosslinkable groups, such as acrylic, methacrylic, α-chloracrylic, vinyl, vinyl ether, epoxide, cyanate, isocyanate or isothiocyanate groups. Particular preference is given to acrylic, methacrylic and vinyl ether groups. Monomeric agents containing two crosslinkable groups are, for example, the diacrylates, the divinyl ethers and the dimethacrylates of diols, for example propanediol, butanediol, hexanediol, ethylene glycol, diethylene glycol, triethylene glycol or tetrapropylene glycol.

Monomeric agents containing three crosslinkable groups are, for example, the triacrylates, the trivinyl ethers and the trimethacrylates of triols, for example trimethylolpropane, ethoxylated trimethylolpropane having 1 to 20 ethylene oxide units, propoxylated trimethylolpropane having 1 to 20 propylene oxide units, mixed ethoxylated and propoxylated trimethylolpropane, in which the total amount of ethylene oxide units and propylene oxide units is from 1 to 20. Other monomeric agents containing three crosslinkable groups are the triacrylates, the trivinyl ethers and the trimethacrylates of glycerol, ethoxylated glycerol having 1 to 20 ethylene oxide units, propoxylated glycerol having 1 to 20 propylene oxide units, and mixed ethoxylated and propoxylated glycerol in which the total number of ethylene oxide units and propylene oxide units is from 1 to 20.

Monomeric agents containing four crosslinkable groups are, for example, the tetraacrylates, the tetravinyl ethers and the tetramethacrylates of tetraols, for example bistrimethylolpropane, ethoxylated bistrimethylolpropane having 1 to 20 ethylene oxide units, propoxylated bistrimethylolpropane having 1 to 20 propylene oxide units, and mixed ethoxylated and propoxylated bistrimethylolpropane in which the total amount of ethylene oxide units and propylene oxide units is from 1 to 20. Other monomeric agents containing four crosslinkable groups are, for example, the tetraacrylates, the tetravinyl ethers and the tetramethacrylates of tetraols, for example pentaerythritol, ethoxylated pentaerythritol having 1 to 20 ethylene oxide units, propoxylated pentaerythritol having 1 to 20 propylene oxide units, and mixed ethoxylated and propoxylated pentaerythritol in which the total amount of ethylene oxide units and propylene oxide units is from 1 to 20.

In order to increase reactivity in the crosslinking or polymerization in air, the binders and monomeric agents can comprise from 0.1 to 10% of a primary or secondary amine. Examples of suitable amines are ethanolamine, diethanolamine and dibutylamine.

The absorption pigment formulation can be prepared by conventional dispersion methods known to the persons skilled in the art using diluents, dispersants, photoinitiators and, if desired, further additives.

Diluents which can be used are water or organic liquids or mixtures thereof, organic liquids being preferred. Particular preference is given to organic liquids having a boiling point of below 140° C., in particular ethers, such as tetrahydrofuran, ketones, such as ethyl methyl ketone, and esters, such as butyl acetate.

Dispersants which can be used are low-molecular-weight dispersants, for example stearic acid, or polymeric dispersants. Suitable polymeric dispersants or dispersion resins are known to the person skilled in the art. Particular mention should be made of polyurethanes containing sulfonate groups, phosphate groups, phosphonate groups or carboxyl groups, vinyl chloride copolymers containing carboxyl groups, and polyimine polyesters and polyether acrylates with or without incorporated functional groups.

Crosslinkable or polymerizable absorption pigment formulations can be prepared using the photoinitiators which are commercially available for photochemical polymerization, for example the photoinitiators listed above for the photochemical polymerization of the cholesteric mixtures.

In the present invention, the composition used for the production of layer B is, in addition to the abovementioned constituents, admixed with a pressure- and/or heat-sensitive adhesive. Adhesives of this type are known per se from the prior art. These include, for example, solvent-containing adhesives based on ethylene-vinyl acetate copolymers, polyacrylates, polymethacrylates, polyisobutenes, solvent-containing adhesive dispersions, such as natural rubber, synthetic rubber, polyvinyl acetate and polyurethane derivatives. For the purposes of the present invention, particular preference is given to hydroxypolyester-polyurethanes, which can be matched within broad limits to the respective technical parameters of the lamination plant to be used in accordance with the invention. If the carbon black dispersion described above is prepared in an aqueous system, polyvinyl alcohol and modified cellulose can also be employed as adhesion-active components. In addition, radiation-crosslinkable, in particular UV-crosslinkable adhesives can also be used in accordance with the invention.

The adhesive effect can be based on both thermal and chemical setting processes. Two-component systems and radiation-curable adhesives are also suitable for the composition of layer B according to the invention.

The following properties are important in the selection of the adhesives:

Good solubility in the solvents used in the pigment dispersion.

Good compatibility with the pigment dispersion.

The heat-activation temperature of the adhesive should be in a temperature range of from 20 to 120° C.

If this adhesive-modified pigment layer is to be wound up in a non-tacky manner directly after the coating operation of layer B, a rapid increase in strength is necessary, which requires an adhesive having a strong crystallization tendency.

The composition of layer B according to the invention is prepared, for example, by compounding the pigment dispersion described above, consisting of pigment, lubricant, dispersion resin and solvent, in a compounder, subsequently adding further solvent, and then adjusting the mixture to the optimum degree of dispersion in a stirrer mill. The progress of the dispersion can be monitored by means of an interference-contrast method, as described, for example, in EP-B-0 032 710. The dispersion process can be terminated when the surface to be tested is agglomerate-free. A layer produced in this way has high gloss and a basic roughness of <100 nm.

A heat- and/or pressure-activatable adhesive, as described above, is subsequently added to the pigment dispersion prepared in this way.

The type and amount of the added adhesive can be determined by any person skilled in the art by means of routine experiments. The following conditions must be satisfied:

The layer adhesion of layers $A^1$, B and $A^2$ to one another must be greater, for example by a factor of at least 2, preferably by a factor of 3, than the respective adhesion of $A^1$ and $A^2$ to the layer support. The adhesive strength of $A^1$ and $A^2$ to the layer support is usually between 0.1 and 2 cN, for example from 0.1 to 1.0 cN.

In the lamination process, it must be possible to transfer the cholesteric layer to the adhesive layer under the selected pressure and temperature conditions, i.e. the adhesion of the cholesteric layer to layer B must be greater than the adhesion to its polymeric layer support.

The layer materials and pigments according to the invention can basically have the following layer sequence:

1) if desired, at least one release layer,
2) at least one cholesteric color-effect layer,
3) at least one adhesive layer, which, if desired, fully or partially absorbs transmitted light,
4) at least one further cholesteric color-effect layer, and
5) if desired, at least one release layer.

Preferred layer supports are known, preferably thermoplastic films made from polyesters, such as polyethylene terephthalate or polyethylene naphthalate, and polyolefins, cellulose triacetate, polycarbonates, polyamides, polyimides, polyamidoimides, polysulfones, aramids or aromatic polyamides. The thickness of the layer supports is preferably from about 5 to 100 $\mu$m, in particular from about 10 to 20 $\mu$m. The layer support can have been subjected to prior corona discharge treatment, plasma treatment, slight adhesion treatment, heat treatment, dust removal treatment or the like. The layer support preferably has a mean center-line surface roughness of 0.03 $\mu$m or less, in particular 0.02 $\mu$m or less, particularly preferably 0.01 $\mu$m or less. In addition, it is desired that the support not only has such a low mean center-line surface roughness, but also has no large projections (elevations) of 1 $\mu$m or more. The roughness profile of the surface of the support can be varied by means of fillers added to the layer support during its production. Examples of suitable fillers are oxides and carbonates of Ca, Si and Ti, and organic fine powders of acrylic substances.

The support can also be a metallized film or a preferably polished metal band, which can also be in the form of a continuous band.

The release layer which may be present comprises, for example, polyolefin compounds or silicone-containing compounds.

The process according to the invention for the production of a cholesteric layered material is preferably carried out as follows:

a) In a first step, a first cholesteric layer $A^1$ is applied to a first layer support by means of one of the abovementioned pouring devices, dried and cured. The layer thickness of this first cholesteric layer is from about 0.5 to 20 $\mu$m, in particular from about 1 to 10 $\mu$m, particularly preferably from about 1 to 3 $\mu$m. The pourable cholesteric mixture $A^1$ preferably has a viscosity in the range from about 10 to 500 mPas, in particular from about 10 to 100 mPas, measured at 23° C. The cholesteric mixture is particularly preferably applied to the layer support at a rate of from about 1 to 800 meters per minute, in particular from about 5 to 100 meters per minute.

b) The adhesive-containing layer B is subsequently applied to the layer $A^1$, cured if desired, but in any case passed through a drying apparatus known from the prior art. The dry-layer thickness of B is in the range from about 0.2 to 3 $\mu$m, particularly preferably from about 0.5 to 1.5 $\mu$m. Layer B is particularly preferably applied to layer $A^1$ by simultaneous coating; however, the two layers can also be applied in separate pouring operations.

c) In a next step, a second cholesteric mixture which forms layer $A^2$ is applied to a second layer support, dried and cured. The pouring operation is preferably carried out analogously to the production of layer $A^1$.

d) This is followed by lamination, i.e. the transfer of layer $A^2$ to the adhesive-coated layer B.

e) The second layer support is then removed from layer $A^2$.

f) The multilayer structure with the layer sequence $A^1/B/A^2$ can be detached from the first layer support and is then ready for use.

The detachment of the multilayer structure from the first layer support can be carried out, for example, by passing it over a deflection roll of small diameter. As a consequence, the crosslinked material delaminates from the support. Other known methods are also suitable, for example peeling off the layer support via a sharp edge, scratching the surface of the layer package by means of an air knife and subsequently blowing by means of compressed air or a jet of water or steam, ultrasound or combinations thereof.

The cholesteric multilayer material, which now has no support, can, if desired, be converted into a multilayer pigment by comminution to the desired particle size. This can be carried out, for example, by grinding in a universal mill. The comminuted pigments can subsequently be classified in order to narrow the particle-size distribution, for example by means of a screening process.

Figure 1:
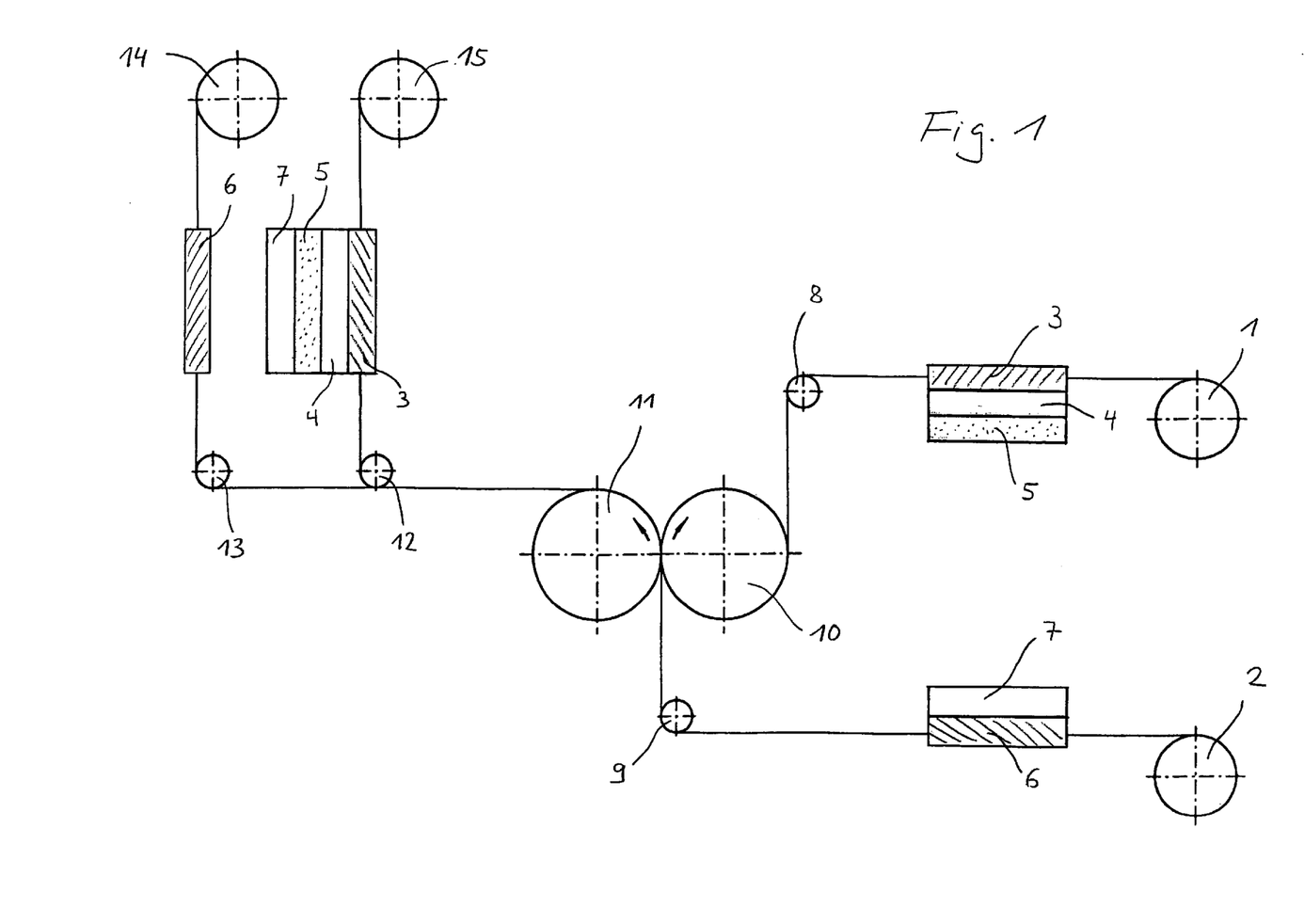
FIG. 1 shows a lamination plant for producing cholesteric multilayered materials

Referring to FIG. 1, which shows a schematic drawing of the lamination plant, the production of a layered structure $A^1/B/A^2$ according to the invention is outlined below.

The first laminate outlined above, consisting of the first layer support 3, the layer 4 (i.e. layer $A^1$) and the layer 5 cast thereon (i.e. layer B), is wound onto a stock roll 1. The second laminate, consisting of the second layer support 6 and the second cholesteric layer 7 (i.e. layer $A^2$), is on a second stock roll 2. The first laminate is fed over a deflection roll 8 with the layer-support side 3 over the surface shell of a heatable roll 10 into the gap between the roll 10 and a roll 11 opposite thereto, where the rolls are counter-rotating. The second laminate is then fed into this gap at the same transport rate as the first laminate by unrolling from the stock roll 2 via a deflection roll 9 in such a way that, on passing through the gap, the adhesive layer 5 of the first laminate and layer $A^2$ (reference symbol 7) of the second laminate are brought into contact with one another. The roll 10 is preferably a heatable steel roll. The roll 11 is preferably a plastic roll, for example provided with a polyurethane jacket, which is pressed against the roll 10. By adjusting the deflection roll 8, the loop angle of the first laminate and thus the heating time can be varied. The roll 11 is pressed against roll 10 at a force of from 1 to 10 kg per centimeter of cast width of the laminate, so that an intimate connection between layer 5 and layer 7 takes place in the roll gap. Since the adhesion of layer 7 to layer 5 is greater than that to the second layer support 6, layer 7 separates from the second layer support 6. The latter is passed over a deflection roll 13 onto a wind-up roll 14. The multilayer structure on the layer support 3, consisting of layers 4, 5 and 7, is wound up onto a wind-up roll 15 on the support side via a further deflection roll 12.

Naturally, numerous modifications of the outlined lamination process are also possible. For example, the production of the first and second laminates and the transfer process can take place in a single operation (in-line). In this case, the first and second laminates are combined immediately after their production, i.e. without interim rolling-up, between the rolls 10 and 11 in the lamination device outlined above.

In a further modification of the above process, the winding-up of the first layer support 3 onto the wind-up roll 15 can be carried out with simultaneous detachment of the multilayered structure 4, 5, 7 from the layer support. The multilayered structure can then either be fed directly to comminution or wound up on a further roll.

If, as outlined above, the first and second laminates are produced in-line with the lamination process, the adhesive in layer B can have a lower activation temperature, preferably in the range from 20 to 50° C., since there is no longer any need to wind up the first laminate after its production. By contrast, if the production process of the first and second laminates and the transfer process are carried out off line, i.e. in separate steps, the adhesive must have a higher activation temperature in the range from 40 to 120° C. so that the first laminate does not stick during winding-up onto the stock roll 1.

The present invention furthermore relates to the use of the pigments according to the invention in the vehicle and vehicle accessory sector, in the leisure, sport and games sector, in the cosmetics area, in the textiles, leather and jewelry areas, in the gift article area, in writing utensils, packaging or spectacle frames, in the construction sector, in the domestic sector and in print products of all types, for example cardboard boxes, packaging, carrier bags, papers, labels or films.

Owing to the wide range of achievable reflection wavelengths, the color effects which can be achieved by the cholesteric films or cholesteric pigments according to the invention also cover the UV and IR regions and of course the region of visible light. If the pigments according to the invention are applied to bank notes, check cards, other cashless payment means or identity documents (for example by known printing processes) or incorporated therein, this makes identical copying, in particular counterfeiting, of these articles considerably more difficult. The present invention thus furthermore relates to the use of the pigments according to the invention for anticounterfeiting treatment of articles, in particular bank notes, check cards or other cashless payment means or identity documents.

The non-limiting examples below serve to explain the invention in greater detail.

EXAMPLE 1

Production of Three-Layer Structures Under Various Production Conditions a) Production of the Supported Layer $A^1$ With the aid of a casting apparatus as described in greater detail in German application file reference 19738369.6, a solution consisting of 45 parts of cholesteric mixture (96.2% of nematic component of the formula (K) and 3.8% of chiral component of the formula (D)), 3 parts of the photoinitiator Irgacure® 907 (from Ciba-Geigy), 0.1 part of Byk 361 (from Byk) and 51.9 parts of methyl ethyl ketone is applied to a polyester film with a thickness of 15 μm. The coated film is then fed through a drying tunnel held at 60° C. The physically dried layer is subsequently cured in-line by irradiation with UV light under a nitrogen atmosphere, and the coated film is wound onto a spool. The cholesteric layer has a thickness of 2 μm and reflects light having a maximum reflection at a wavelength of 505 nm perpendicularly to the layer plane. To the naked eye, the layer appears green on a black background when viewed perpendicularly, with a color change to blue when the layer is viewed at an angle.

b) Production of the Interlayer B 150 g of color black Regal 400R (manufacturer: Cabot Corporation) are compounded in a laboratory compounder having a capacity of 300 ml for 1 hour with 3 g of stearic acid, 40 g of a phosphonate-containing dispersion resin, 50% in tetrahydrofuran, described in DE-A-195 16 784, and 40 g of methyl ethyl ketone. The resultant compounded composition (solids content 70.7%) is subsequently adjusted to a solids content of 25% in a dissolver with 499 g of methyl ethyl ketone. This dispersion is then dispersed out optimally in a stirrer mill (Dispermat SL, grinding chamber volume 125 ml, grinding elements zirconium oxide 1–1.25 mm). The progress of the dispersion is monitored by means of an interference contrast method (EP-B-0 032 710). The final fineness is achieved when the surface to be tested is agglomerate-free. A layer produced therefrom has high gloss and a basic roughness of ≦100 nm.

260 g of polyester-polyurethane adhesive (Desmocoll 400; manufacturer: Bayer AG) are added to the resultant dispersion in the following amounts: samples 1 and 2: 260 g, samples 3, 3a and 4: 298 g, samples 5 and 6: 335 g. This adhesive had previously been adjusted to a solids content of 15% using methyl ethyl ketone. The adhesive is incorporated by means of a dissolver. The dispersion produced by this process has a high-gloss, defect-free surface even after addition of the adhesive.

The dispersion produced in this way is cast onto layer $A^1$ in a layer thickness of 0.8 μm using the casting apparatus from step a) and dried at room temperature, giving the first laminate.

c) Production of the Supported Layer $A^2$

Analogously to step a), layer $A^2$ is applied to a second polyester film, likewise with a thickness of 15 μm. The post-treatment is likewise carried out as in step a). The second laminate is obtained in this way.

d) Production of the Three-Layer Laminate $A^1/B/A^2$

The laminate produced by the abovementioned steps a) and b) runs on the support side for heating over a roll heated to the desired lamination temperature. The second laminate is fed at the same rate as the first laminate so that layers B and $A^2$ come into contact with one another. A second roll is pressed against the heating roll and the two laminates running over it at a force of 5 kg/cm of film width, so that an intimate connection between layer B and layer A² takes places in the roll gap.

The second support film is subsequently peeled off from the three-layer laminate and wound up separately. The three-layer laminate remaining on the first support film is likewise wound up. Sample 3a is additionally heated at 80° C. for 16 hours. The adhesive force is determined, as described in Example 3, for B/A¹ and B/A².

e) Removal Of The Three-Layer Laminate From The First Support Film

The three-layer laminate supported as described under d) is removed from the polyester support film by damaging the three-layer laminate transversely to the film web direction using a razor blade and then blown off using compressed air forced through a slit nozzle. During this operation, the coated film is continuously moved past the slit nozzle, and the three-layer laminate blown off is collected in the form of flakes. The three-layer flakes have a thickness of 6 μm and exhibit a strong green color on both sides when viewed perpendicularly, with a color change to blue when viewed at an angle to the flakes.

f) Grinding Of The Three-Layer Flakes To Give A Pigment 10 g of cholesteric flakes produced as described under e) are mixed with 100 g of sodium chloride and ground 6 times for 2 minutes in an impact knife mill. After grinding, the salt is washed out with water and the pigment is isolated.

The composition of the respective adhesive layer and the lamination conditions used in each case and the adhesive-force values determined are shown in Table 1 below for all the samples.

Figure 2:
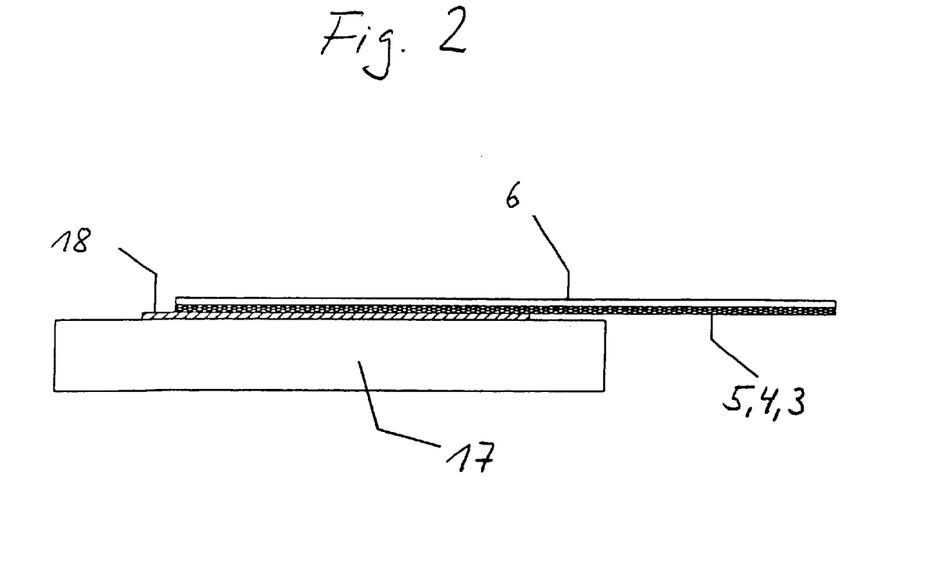
FIG. 2 shows application of the cholesteric layer with an adhesive layer
Figure 3:
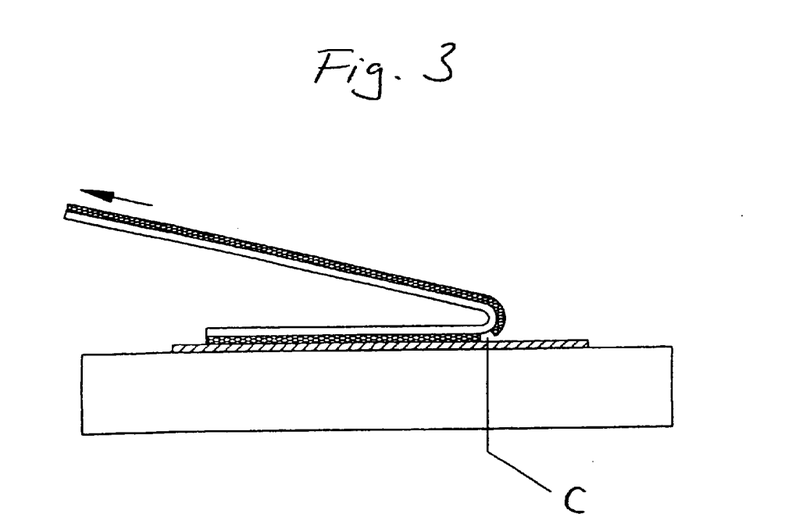
FIG. 3 shows tearing of the three layer laminate.
Figure 4:
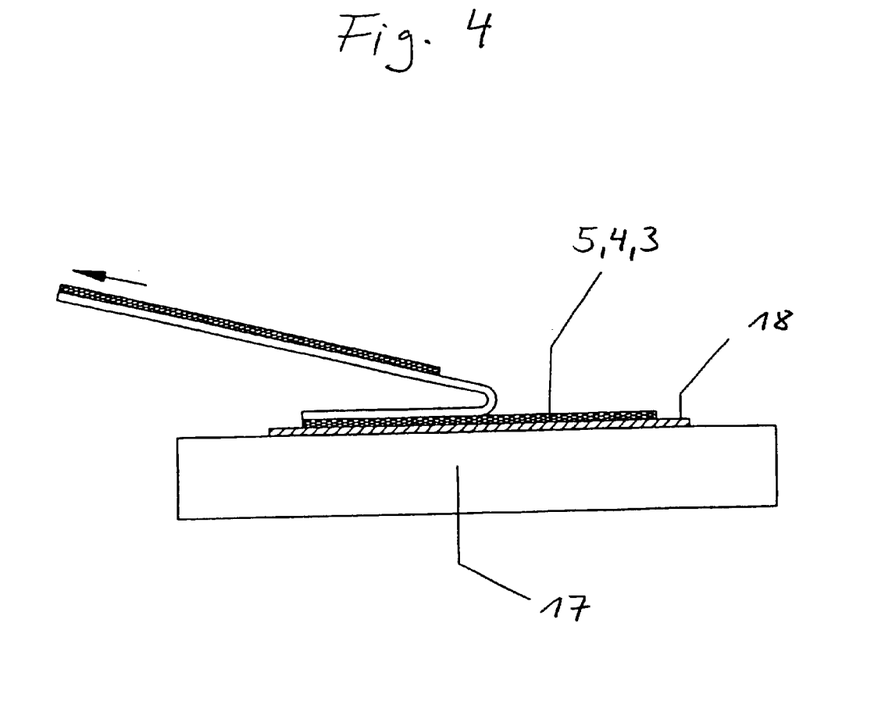
FIG. 4 shows measurement of the adhesive strength of the cholesteric layer to the support layer
Figure 5:
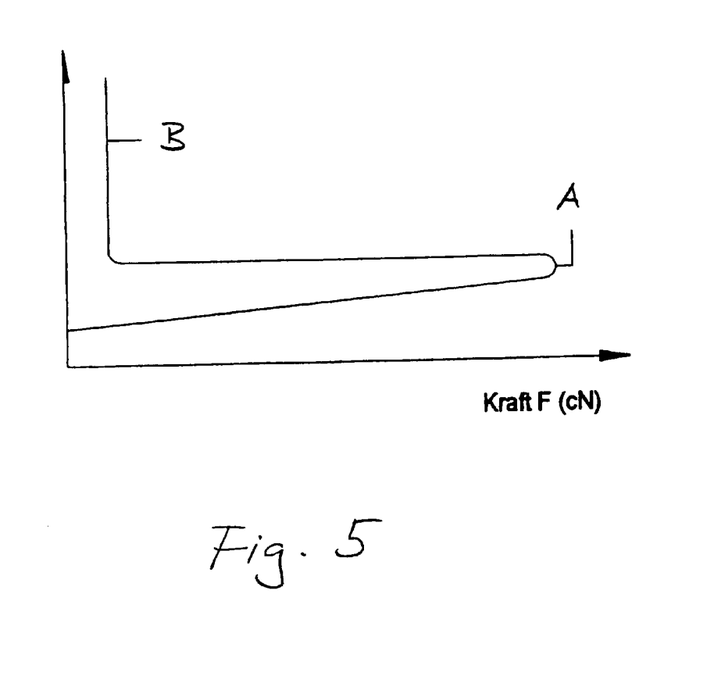
FIG. 5 shows a force diagram of the adhesive strength of the cholesteric layer on the film.

A piece of adhesive tape 18 with a length of about 5 cm is fixed to a flat metal plate 17. The adhesive tape 18 used can be any commercially available adhesive tape which gives an adhesive force with a PET reference film, under otherwise identical measurement conditions, of from about 7.3 to 7.9 cN, in particular about 7.6 cN. The PET reference film used here is a PET film, type E2R, from Teijin, thickness 9 μm, width 6.35 mm, surface roughness Rz in accordance with DIN 4768 0.86 μm, surface roughness Ra in accordance with DIN 4768/1 0.012 μm, in accordance with EP-B-0 032 710 (interference contrast method) from 75 to 125 nm. The adhesive layer is upwardly directed and faces away from the plate. The laminate to be measured, consisting of the layer support 6 and the three-layer laminate 3, 4, 5, is applied in such a way that a cholesteric layer comes into contact with the adhesive layer, as shown in FIG. 2. The free end of the laminate is bent in such a way that it forms an angle of 160° with the plane of the metal plate. The free end is pulled against the adhering end of the tape in the direction of the arrow at a constant rate of 0.1 mm per second, the tensile force in the tape increasing constantly until the three-layer laminate tears apart at point C (FIG. 3). FIG. 5 shows the change in force, and point A is the tear peak of the three-layer laminate. In the remainder of the measurement, the adhesive strength of the cholesteric layer to the layer support is measured, as shown in FIG. 4. In the force diagram shown in FIG. 5, point B denotes the adhesive strength of the cholesteric layer on the film. It can be seen from the diagram that the force needed to tear the layer apart (point A) is a multiple greater than the force needed to detach the cholesteric layer from the layer support.

TABLE 1

| Sample | Carbon black | Adhesive | Lamination temperature | m/min | Pressure[2] | Layer transfer A² | Adhesive force B/A¹ | Adhesive force B/A² |
|---|---|---|---|---|---|---|---|---|
| 1 | 100[1] | 173[1] | 60° C. | 8 | 3.8 | no | not determined | not determined |
| 2 | 100 | 173 | 90° C. | 8 | 3.8 | partial | determined | determined |
| 3 | 100 | 198 | 70° C. | 8 | 3.8 | complete | ≧8.6 cN | 4.0 cN |
| 3a | 100 | 198 | 70° C., conditioned | 8 | 3.8 | complete | ≧8.6 cN | ≧8.6 cN |
| 4 | 100 | 198 | 90° C. | 8 | 3.8 | complete | ≧8.6 cN | 4.6 cN |
| 5 | 100 | 223 | 60° C. | 8 | 3.8 | complete | ≧8.6 cN | 8.2 cN |
| 6 | 100 | 223 | 90° C. | 8 | 3.8 | complete | ≧8.6 cN | 3.0 cN |

1) Parts by weight, based on the dry weight of the adhesive layer
2) Line pressure (kg/cm)

No layer transfer of A² to the first laminate took place in sample 1 and only partial transfer took place in sample 2, while complete layer transfer was observed in all the other samples. During grinding to give three-layer flakes (step f), only slight delamination of the laminate B/A² was observed in the case of samples 3 to 6. Sample 3a exhibited virtually no delamination.

Since the adhesive force of the cholesteric layers A¹ and A² on the layer support is between 0.2 and 0.5 cN, it can be seen from the measurement values that the adhesive force within the three-layer laminate is significantly higher than the adhesive force of the cholesteric layer to the layer support.

The measurement of the adhesive force is described below.

EXAMPLE 2

Measurement Of The Adhesive Force

The measurement of the adhesive force is carried out as follows, reference being made to FIGS. 2 to 5.

The tensile stresses in the tape (3, 4, 5, 6) are recorded using a high-resolution sensor and plotted as peel force in cN using a y-T plotter. In the present case, the maximum tensile strength is given by the adhesion of the adhesive tape 17 to the three-layer laminate 3, 4, 5, which is 8.6 cN. Higher tensile forces can consequently not be measured using this arrangement.

We claim:

1. A cholesteric layered material having the layer sequence A¹/B/A², where A¹ and A² are identical or different and each comprise at least one aligned cholesteric layer and B is at least one adhesive interlayer separating layers A¹ and A² from one another, wherein the cholesteric layered material is obtained by applying a coating composition to a first support layer to form a supported cholesteric layer A¹, applying an adhesive composition to the supported cholesteric layer A¹ to form an supported A¹/B laminate, applying a coating composition to a second support layer to form a supported cholesteric layer A², laminating the supported cholesteric layer $A^2$ the supported laminate $A^1/B$ by contacting the adhesive layer B with the cholesteric layer $A^2$, and detaching at least one of the support layers, wherein the adhesive force between the adhesive layer B and layers $A^1$ and $A^2$ is at least twice the adhesive force between the cholesteric layers $A^1$ and $A^2$ and any of the support layers.

2. A cholesteric layered material as claimed in claim 1, wherein both cholesteric layers $A^1$ and $A^2$ are produced in an identical manner.

3. A cholesteric layered material as claimed in claim 1, wherein the adhesive layer B comprises at least one heat- and/or pressure-activatable adhesive.

4. A cholesteric layered material as claimed in claim 3, wherein the heat- and/or pressure-activatable adhesive is selected from the group consisting of a solvent-containing polyurethane, a solvent-containing adhesive comprising an ethylene-vinyl acetate copolymer, a polyacrylate, a polymethacrylate a polyisobutene, a solvent-containing adhesive dispersion, a natural rubber, a synthetic rubber comprising polyvinyl acetate, a synthetic rubber comprising polyurethane, a polyvinyl alcohol, a modified cellulose and mixtures thereof.

5. A cholesteric layered material as claimed in claim 3, wherein the adhesive can be activated at a line pressure in the range from 1 to 30 kg/cm of cast width and/or at a temperature in the range from 20 to 120° C.

6. A cholesteric layered material as claimed in claim 1, wherein the adhesive layer B comprises at least one selected from the group consisting of an inorganic pigment, an organic pigment, a white pigment, a colored pigment, a black pigment and a UV absorber.

7. A cholesteric layered material as claimed in claim 1, wherein the layer thicknesses of $A^1$ and $A^2$ are from 0.5 to 20 µm.

8. A cholesteric layered material as claimed in claim 1, wherein the thickness of layer B is from 0.3 to 3 µm.

9. The cholesteric layered material as claimed in claim 1, wherein the absorptive pigment is selected from the group consisting of an organic pigment, an UV absorber and an inorganic pigment.

10. A cholesteric layered material as claimed in claim 1, where $A^1$ and $A^2$ comprise, independently of one another, at least one cholesteric mixture selected from the group consisting of a cholesteric, polymerizable monomer;

an achiral, nematic, polymerizable monomer and a chiral compound;

a cholesteric, crosslinkable polymer;

a cholesteric polymer in a polymerizable diluent; and a cholesteric polymer whose cholesteric phase can be frozen by rapid cooling to below the glass transition temperature, in a cured state.

11. A process for the production of cholesteric layered material having a layer sequence $A^1/B/A^2$ as claimed in claim 1, which comprises the following steps:

a) application of a first coating composition forming the layer $A^1$ to a first layer support with subsequent curing of the layer $A^1$;

b) application of a second coating composition which forms the adhesive layer B and comprises at least one heat and/or pressure-activatable adhesive to the supported layer $A^1$ with formation of the laminate $A^1/B$;

c) application of a third coating composition which forms the layer $A^2$ to a second layer support with subsequent curing of the layer $A^2$;

d) lamination of $A^2$ onto the laminate $A^1/B$ by bringing the free sides of the layers $A^2$ and B into contact under the action of pressure and/or temperature with formation of the laminate $A^1/B/A^2$;

e) detachment of the second layer support from the laminate $A^1/B/A^2$; and f) if desired, detachment of the first layer support from the laminate $A^1/B/A^2$.

12. A process as claimed in claim 11, wherein a) and b) are carried out in a single operation by simultaneous or sequential application of $A^1$ and B to the first layer support.

13. A process as claimed in claim 11, wherein the supported laminate $A^1/B$ is fed, with its layer-support side, over a roll, which may be heatable and which is opposite a further roll, which may be heatable, over which the supported layer $A^2$ is likewise passed with its layer-support side, the gap between the rolls and being adjustable through radial movement of the two rolls with respect to one another in such a way that the contact pressure between the supported laminate $A^1/B$ and the supported layer $A^2$ is in the range from 1 to 10 kg/cm of coating width.

14. A process as claimed in claim 13, wherein the supported laminate $A^1/B$ and/or the supported layer $A^2$ is/are passed over from 1 to 359° of the circumference of the heatable roll or the roll.

15. A platelet-shaped cholesteric multilayered pigment obtainable by a process as claimed in claim 14.

16. A process for the production of platelet-shaped cholesteric multilayered pigments having the layer sequence $A^1/B/A^2$, comprising grinding a cholesteric layered material obtained by the process as claimed in claim 1 to a particle size in the range of up to 200 µm.

17. A platelet-shaped cholesteric multilayered pigment obtainable by a process as claimed is claim 16.

18. A platelet-shaped cholesteric multilayered pigment as claimed in claim 17, which has a mean particle size in the range from 10 to 50 µm and a thickness of from 2 to 10 µm.

19. A composition comprising at least one multilayered pigment as claimed in claim 17.

20. A process comprising:

coating a vehicle with the composition as claimed in claim 19.

21. A coating composition as claimed in claim 20, which is selected from the group consisting of effect coatings, paints and films.

22. A coating composition comprising at least one multilayered pigment as claimed in claim 17.

23. An anticounterfeiting treatment comprising:

applying the multilayered pigment claimed in claim 17 to an article.

24. An article coated with the platelet-shaped cholesteric multilayered pigment as claimed in claim 17.

25. The cholesteric layered material as claimed in claim 1, wherein both the first and second support layers are detached.

26. The cholesteric layered material as claimed in claim 1, consisting of a cholesteric layer $A^1$, an adhesive layer B and a cholesteric layer $A^2$.

27. The cholesteric layered material as claimed in claim 1, wherein the adhesive force between layer B and the layers $A^1$ and $A^2$ is at least three times the adhesive force between the cholesteric layers $A^1$ and $A^2$ and any of the support layers.

28. The cholesteric layered material as claimed in claim 1, wherein the adhesive force between layer B and the layers $A^1$ and $A^2$ is at least five times the adhesive force between the cholesteric layers $A^1$ and $A^2$ and any of the support layers.

29. The cholesteric layered material as claimed in claim 1, wherein the adhesive layer B is directly adjacent to the cholesteric layers $A^1$ and $A^2$.

30. The cholesteric layered material as claimed in claim 1, wherein the layer B partially a orbs transmitted light.

31. The cholesteric layered material as claimed in claim 1, wherein the layer B completely absorbs transmitted light.

32. A coating comprising the cholesteric layered material as claimed in claim 1.

33. The cholesteric layered material as claimed in claim 1, wherein the adhesive layer B is in direct contact with the cholesteric layers of layer $A^1$ and layer $A^2$.

34. A cholesteric layered material having the layer sequence $A^1/B/A^2$, wherein $A^1$ and $A^2$ are identical or different and each is an aligned cholesteric layer, B is an interlayer separating layers $A^1$ and $A^2$ from one another, and layer B is a light absorbing dispersion of an adhesive and at least one absorptive pigment wherein the adhesive force between the adhesive layer B and layers $A^1$ and $A^2$ is at least twice the adhesive force between the cholesteric layers $A^1$ and $A^2$ and any support layers.

* * * * *